US 9,952,455 B2

United States Patent
Roth et al.

(10) Patent No.: US 9,952,455 B2
(45) Date of Patent: Apr. 24, 2018

(54) ATHERMAL OPTICAL FILTER WITH ACTIVE TUNING AND SIMPLIFIED CONTROL

(71) Applicant: Aurrion, Inc., Goleta, CA (US)

(72) Inventors: Jonathan Edgar Roth, San Francisco, CA (US); Daniel Knight Sparacin, Washington, DC (US); Gregory Alan Fish, Santa Barbara, CA (US)

(73) Assignee: Aurrion, Inc., Goleta, CA (US)

( * ) Notice: Subject to any disclaimer, the term of this patent is extended or adjusted under 35 U.S.C. 154(b) by 0 days.

(21) Appl. No.: 15/612,364

(22) Filed: Jun. 2, 2017

(65) Prior Publication Data

US 2017/0269390 A1    Sep. 21, 2017

Related U.S. Application Data

(63) Continuation of application No. 14/929,603, filed on Nov. 2, 2015, now Pat. No. 9,684,190, which is a (Continued)

(51) Int. Cl.
*G02B 6/26* (2006.01)
*G02F 1/01* (2006.01)
(Continued)

(52) U.S. Cl.
CPC .......... *G02F 1/0147* (2013.01); *G02B 6/122* (2013.01); *G02F 1/011* (2013.01); *G02F 1/0121* (2013.01); *G02B 2006/12135* (2013.01)

(58) Field of Classification Search
None
See application file for complete search history.

(56) References Cited

U.S. PATENT DOCUMENTS

| 3,308,394 A | 3/1967 | Snitzer |
| 5,159,699 A | 10/1992 | De Monts |

(Continued)

FOREIGN PATENT DOCUMENTS

| EP | 1628150 A1 | 2/2006 |
| EP | 2302429 A1 | 3/2011 |

(Continued)

OTHER PUBLICATIONS

"U.S. Appl. No. 15/148,862, Non Final Office Action dated Jun. 15, 2017", 13 pgs.

(Continued)

*Primary Examiner* — Tina Wong
(74) *Attorney, Agent, or Firm* — Schwegman Lundberg & Woessner, P.A.

(57) ABSTRACT

Embodiments of the invention describe systems, apparatuses and methods for providing athermicity and a tunable spectral response for optical filters. Finite impulse response (FIR) filters are commonly implemented in photonic integrated circuits (PICs) to make devices such as wavelength division multiplexing (WDM) devices, asymmetric Mach-Zehnder interferometers (AMZIs) and array waveguide gratings (AWGs). Athermicity of an FIR filter describes maintaining a consistent frequency transmission spectrum as the ambient temperature changes. A tunable spectral response for an FIR filter describes changing the spectrum of an FIR filter based on its application, as well as potentially correcting for fabrication deviations from the design. In addition, embodiments of the invention reduce energy dissipation requirements and control complexity compared to prior art solutions.

19 Claims, 8 Drawing Sheets

Related U.S. Application Data continuation of application No. 13/751,492, filed on Jan. 28, 2013, now Pat. No. 9,207,399.

(51) Int. Cl.
*G02B 6/122* (2006.01)
*G02B 6/12* (2006.01)

(56) References Cited

U.S. PATENT DOCUMENTS

| | | | |
|---|---|---|---|
| 5,617,234 A * | 4/1997 | Koga | G02B 6/12011 385/37 |
| 5,701,371 A | 12/1997 | Ishida | |
| 6,289,147 B1 | 9/2001 | Bulthuis et al. | |
| 6,421,478 B1 | 7/2002 | Paiam | |
| 6,434,292 B1 | 8/2002 | Kim et al. | |
| 6,466,707 B1 | 10/2002 | Dawes et al. | |
| 6,574,409 B1 | 6/2003 | Moroni et al. | |
| 6,574,413 B1 | 6/2003 | Dieckroger | |
| 6,853,773 B2 | 2/2005 | Lin | |
| 6,870,992 B2 | 3/2005 | Grosjean et al. | |
| 6,978,056 B2 | 12/2005 | Tavlykaev | |
| 6,987,913 B2 | 1/2006 | Blauvelt et al. | |
| 7,050,681 B2 | 5/2006 | Blauvelt et al. | |
| 7,095,920 B1 | 8/2006 | Little | |
| 7,343,066 B2 | 3/2008 | Doerr et al. | |
| 8,207,509 B2 | 6/2012 | Lundquist et al. | |
| 8,369,666 B2 | 2/2013 | Kamei et al. | |
| 8,805,187 B2 * | 8/2014 | McGreer | G02B 6/12033 398/196 |
| 9,207,399 B2 | 12/2015 | Roth et al. | |
| 9,684,190 B1 * | 6/2017 | Roth | G02F 1/0147 |
| 2001/0028769 A1 | 10/2001 | Deacon | |
| 2002/0126933 A1 | 9/2002 | Goh | |
| 2002/0181857 A1 | 12/2002 | Komatsu et al. | |
| 2003/0035609 A1 | 2/2003 | Hatanaka | |
| 2003/0039461 A1 | 2/2003 | How Kee Chun et al. | |
| 2003/0048970 A1 | 3/2003 | Cole et al. | |
| 2003/0123799 A1 | 7/2003 | Lazaro Villa | |
| 2003/0210845 A1 | 11/2003 | Shani et al. | |
| 2003/0223694 A1 | 12/2003 | Nikonov et al. | |
| 2004/0028367 A1 | 2/2004 | Nara et al. | |
| 2004/0136647 A1 | 7/2004 | Mizuno et al. | |
| 2005/0002594 A1 | 1/2005 | Parker et al. | |
| 2005/0111778 A1 | 5/2005 | Takahashi | |
| 2006/0051010 A1 | 3/2006 | Chu et al. | |
| 2006/0098910 A1 | 5/2006 | Bintz et al. | |
| 2007/0086719 A1 | 4/2007 | Takahashi et al. | |
| 2009/0087138 A1 | 4/2009 | Yan et al. | |
| 2009/0245316 A1 | 10/2009 | Sysak et al. | |
| 2010/0111533 A1 | 5/2010 | Beckett et al. | |
| 2011/0110624 A1 | 5/2011 | Kamei et al. | |
| 2012/0002918 A1 | 1/2012 | Kawashima et al. | |
| 2012/0057816 A1 | 3/2012 | Krasulick et al. | |
| 2012/0251029 A1 | 10/2012 | Kobrinsky et al. | |
| 2013/0108204 A1 | 5/2013 | Takabayashi et al. | |
| 2014/0079082 A1 | 3/2014 | Feng et al. | |
| 2014/0212092 A1 | 7/2014 | Roth et al. | |
| 2014/0328591 A1 | 11/2014 | Koch et al. | |
| 2015/0124845 A1 | 5/2015 | Koch et al. | |
| 2015/0192803 A1 | 7/2015 | Lee et al. | |
| 2016/0173221 A1 | 6/2016 | Kato | |
| 2017/0023736 A1 | 1/2017 | Bauters et al. | |

FOREIGN PATENT DOCUMENTS

| | | | |
|---|---|---|---|
| EP | 2463694 A1 | 6/2012 | |
| EP | 2871504 A1 | 5/2015 | |
| JP | 2000249993 A | 9/2000 | |
| JP | 2010175645 A | 8/2010 | |
| WO | WO-03042734 A2 | 5/2003 | |
| WO | WO-2017019145 A1 | 2/2017 | |

OTHER PUBLICATIONS

"U.S. Appl. No. 15/148,862, Response filed Sep. 15, 2017 to Non Final Office Action dated Jun. 15, 2017", 11 pgs.

"U.S. Appl. No. 13/751,492, Examiner Interview Summary dated Mar. 24, 2015", 3 pgs.

"U.S. Appl. No. 13/751,492, Final Office Action dated Apr. 15, 2015", 8 pgs.

"U.S. Appl. No. 13/751,492, Non Final Office Action dated Nov. 18, 2014", 11 pgs.

"U.S. Appl. No. 13/751,492, Notice of Allowance dated Aug. 26, 2015", 5 pgs.

"U.S. Appl. No. 13/751,492, Response filed Aug. 13, 2015 to Final Office Action dated Apr. 15, 2015", 6 pgs.

"U.S. Appl. No. 13/751,492, Response fled Mar. 18, 2015 to Non Final Office Action dated Nov. 18, 2014", 13 pgs.

"U.S. Appl. No. 13/899,336, Non Final Office Action dated May 5, 2014", 11 pgs.

"U.S. Appl. No. 14/073,687, Non Final Office Action dated Jan. 4, 2016", 16 pgs.

"U.S. Appl. No. 14/929,603, Final Office Action dated Jan. 23, 2017", 14 pgs.

"U.S. Appl. No. 14/929,603, Non Final Office Action dated Nov. 1, 2016", 13 pgs.

"U.S. Appl. No. 14/929,603, Notice of Allowance dated Mar. 31, 2017", 5 pgs.

"U.S. Appl. No. 14/929,603, Preliminary Amendment filed Dec. 28, 2015", 7 pgs.

"U.S. Appl. No. 14/929,603, Response filed Jan. 6, 2016 to Non Final Office Action dated Nov. 1, 2016", 13 pgs.

"U.S. Appl. No. 14/929,603, Response filed Mar. 20, 2017 to Final Office Action dated Jan. 23, 2017", 6 pgs.

"APSS Apollo application note on array waveguide grating (AWG)", [Online] retrieved from the internet: (www.apollophotonics.com), (Aug 13, 2012), 1-24.

"European Application Serial No. 14000807.9, Extended European Search Report dated Jun. 16, 2014", 6 pgs.

"European Application Serial No. 14003719.3, Noting of Loss of Rights dated Dec. 23, 2015", 1 pg.

"European Patent Office Application Serial No. 14003719.3, Extended European Search Report dated Mar. 11, 2015", 3 Pages.

"International Application Serial No. PCT/US2016/031316, International Search Report dated Sep. 19, 2016", 5 pgs.

"International Application Serial No. PCT/US2016/031316, Invitation to Pay Additional Fees and Partial Search Report dated Jun. 30, 2016", 2 pgs.

"International Application Serial No. PCT/US2016/031316, Response filed Jul. 28, 2016 to Partial Search Report dated Jun. 30, 2016", 1 pg.

"International Application Serial No. PCT/US2016/031316, Written Opinion dated Sep. 19, 2016", 15 pgs.

Dieckroger, J, et al., "Thermooptically Tunable Optical Phased Array in SiO—Si", IEEE Photonics Technology Letters, 11(2), (Feb. 1999), 248-250.

Ding, et al., "Fabrication tolerant polarization splitter and rotator based on a tapered directional coupler", Optical Society of America, vol. 20, (Aug. 27, 2012), 7 pgs.

Doerr, et al., "Wide Bandwidth Silicon Nitride Grating Coupler", IEEE Photonics Technology Letters vol. 22, (Oct. 1, 2010), 1461-1463.

Fan, et al., "High Directivity, Vertical Fiber-to-Chip Coupler with Anisotropically Radiating Grating Teeth", Optical Society of America, (2007), 2 pgs.

Ishii, et al., "SMT-Compatible Optical-I/O Chip Packaging for Chip-Level Optical Interconnects", IEEE, 2001 Electronic Components and Technology Conference, (2001), 6 pgs.

Little, Brent E, et al., "Design Rules for Maximally Flat Wavelength-Insensitive Optical Power Dividers Using Mach-Zehnder Structures", IEEE PhotonicsTechnology Letters vol. 9, (Dec. 12, 1997).

Liu, et al., "Silicon-on-insulator polarization splitting and rotating device for polarization diversity circuits", Optical Society of America, vol. 19, (Jun. 20, 2011), 6 pgs.

(56) References Cited

OTHER PUBLICATIONS

Vermeulen, et al., "High-efficiency fiber-to-chip grating couplers realized using an advanced CMOS-compatible Silicon-On-Insulator platform", Optical Society of America, vol. 18, (Aug. 16, 2010), 6 pgs.

Yang, Yan, et al., "Thermo-Optically Tunable Silicon AWG With Above 600 GHz Channel Tunability", IEEE Photonics Technology Letters, 27(22), (Nov. 15, 2015), 2351-2354.

* cited by examiner

ATHERMAL OPTICAL FILTER WITH ACTIVE TUNING AND SIMPLIFIED CONTROL

This application is a continuation of U.S. application Ser. No. 14/929,603, filed Nov. 2, 2015, which claims priority to U.S. application Ser. No. 13/751,492, filed Jan. 28, 2013, each of which are incorporated herein by reference in their entirety.

FIELD

Embodiments of the invention generally pertain to optical devices and more specifically to optical filters.

BACKGROUND

Finite impulse response (FIR) filters are commonly implemented in photonic integrated circuits (PICs) to make devices such as asymmetric Mach-Zehnder interferometers (AMZIs), array waveguide gratings (AWGs), or wavelength division multiplexing (WDM) devices. FIR stages can also be assembled in series to make a more complex filter. FIR filter devices may be deployed in environments where there can be wide variations in ambient temperature, due to both environmental changes and the use of heat-dissipating components.

FIR filters implemented in PICs have several technical problems. As the materials used to construct PICs have a temperature-dependent index of refraction, temperature changes to FIR filter devices can affect the spectral characteristics of the FIR filter. Correcting for this in a deployed PIC typically requires maintaining the device temperature within a narrow range; this maintenance may require energy-intensive heating of the entire PIC package.

Furthermore, especially in the case of silicon-on-insulator (SOI) PICs, fabricated devices commonly have deviations from the design which lead to changes in the transmission spectrum. This is because SOI waveguides have a strong refractive index contrast between the silicon core and silicon dioxide cladding, and also because of the small dimensions typical of SOI waveguides; these small dimensions lead the effective index of a mode to be strongly dependent on changes in waveguide cross sectional dimensions. Fabrication deviations may be local, affecting different regions of a PIC to different degrees, or global, causing a constant deviation of the waveguide cross section from the design. Both local and global deviations detune the spectral response of an FIR filter.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
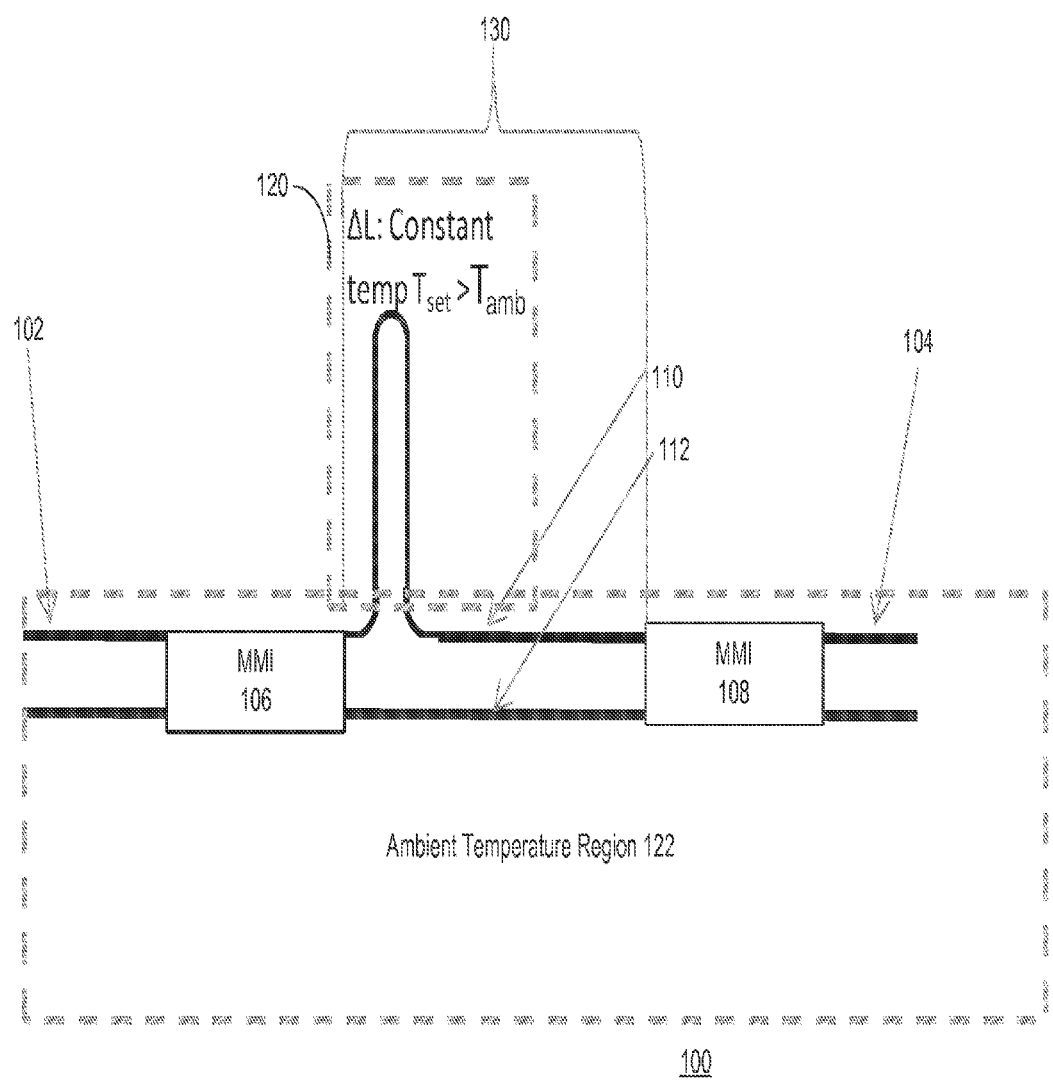
FIG. 1 is an illustration of an athermal optical device according to an embodiment of the invention.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DESCRIPTION

Embodiments of the invention describe systems, apparatuses and methods for providing athermicity and a tunable spectral response for optical filters. Finite impulse response (FIR) filters are commonly implemented in photonic integrated circuits (PICs) to make devices such as wavelength division multiplexing (WDM) devices, asymmetric Mach-Zehnder interferometers (AMZIs) and array waveguide gratings (AWGs). Athermicity of an FIR filter describes maintaining a consistent frequency transmission spectrum as the ambient temperature changes. A tunable spectral response for an FIR filter describes changing the spectrum of an FIR filter based on its application, as well as potentially correcting for fabrication deviations from the design. In addition, embodiments of the invention reduce energy dissipation requirements and control complexity compared to prior art solutions.

In some embodiments of the invention, athermal operation of an FIR filter on a PIC is obtained via active control by heating a region of the filter. A control feedback loop maintains a set point (i.e., constant) temperature for the heated region; thus, there is no need to sense the ambient temperature or change the heated region's temperature as a function of the ambient temperature.

By changing the set point temperature, the transmission spectrum of a filter may be linearly shifted to actively tune the filter's response. Shifting the transmission spectrum of a filter may also be used to correct for deviations of the fabricated device from the design. In the case of a global error in fabrication where all waveguides have a different effective index from what was designed, the fabricated device will have a linear spectral shift from the design intent, which embodiments of the invention can correct. Because only a fraction of the area of the device is to be selectively heated, this method of active control is power-efficient.

Embodiments of the invention further describe design features for improving the power efficiency of a device. In some embodiments, the above described heated region is thermally isolated from the above described ambient region through modification of the thermal conduction path between the heated region and the ambient region, such as through localized thermal engineering of the substrate. In some embodiments, devices are designed to have waveguide regions having different thermo-optic coefficients (alternatively referred to herein as 'dn/dT,' as described below), either from differing materials or differing waveguide cross-sections, wherein a region where waveguides have a high dn/dT is heated, while the remaining bulk of the FIR device uses waveguides with a low dn/dT. Control at the PIC scale can be further simplified if an actively heated region is shared by two or more FIR filter devices.

Throughout this specification, several terms of art are used. These terms are to take on their ordinary meaning in the art from which they come, unless specifically defined herein or the context of their use would clearly suggest otherwise. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

FIG. 1 is an illustration of an athermal optical device according to an embodiment of the invention. Optical device 100 is shown to be an AMZI including input ports 102, output ports 104, and multi-mode interference (MMI) couplers 106 and 108. As described herein, a waveguide propagation section is defined as the region between the input and output ports where there is more than one waveguide, and the waveguides have different delays/optical path lengths. At the output port (such as output ports 104), light from different waveguides in the waveguide propagation section have undergone interference—for example with an MMI (such as MMIs 106 and 108) or a star coupler.

In this example, waveguides 110 and 112 in the waveguide propagation section each have differing lengths, wherein waveguide 110 is longer than waveguide 112. In this example embodiment, the waveguide cross sections do not necessarily vary in the waveguide propagation section; however, other embodiments described below do utilize varying waveguide cross sections in both dimensions and thermo-optic coefficients (dn/dT). In embodiments where different waveguides in the waveguide propagation section have different deviations in the cross section, said waveguides are to be heated differently. For example, in embodiments having three or more waveguides in the waveguide propagation section, the spectrum may be changed in a manner in which different waveguides would be heated separately in order to correct their individual phase errors (e.g., local fabrication errors). In embodiments with only two waveguides in the waveguide propagation section having different deviations in the cross section, a single heater may be used to shift the spectrum to correct the deviation.

In this embodiment, a section of waveguide 110, shown to be included in region 120, is heated to fixed temperature $T_{set}$ which is greater than the ambient temperature of AMZI 100, $T_{amb}$. The region of AMZI 100 subjected to the ambient temperature is shown as region 122. The length of the waveguide section included in heated region 120 is the difference in lengths between waveguide 110 and waveguide 112. In other words, the lengths of each waveguide which are affected by changes in $T_{amb}$ (shown as length 130) are equal, and the section of waveguide 110 included in heated region 120 does not experience any variations in optical path length with variations in $T_{amb}$. Because the relative phase of modes in different waveguides at the outputs of the waveguide propagation section does not change with changes to $T_{amb}$, the amplitude transmission characteristic of AMZI 100 is athermal and is thus not restricted to operate within a narrow temperature range as are prior art optical devices.

In one embodiment, region 120 of AMZI 100 represents a boundary line with low thermal conductivity. The effect of the design of AMZI 100 having heated region 120 is to improve power efficiency, increase temperature uniformity in the $T_{set}$ region, and minimize the heating of region 122. This may be achieved in a silicon-on-insulator (SOI) platform, for example, by etching a groove in the top silicon to remove a thermal conduction path between the $T_{set}$ region and $T_{amb}$ region. Additionally the substrates could be etched to remove thermal conduction paths.

In another embodiment, the outline of region 120 (i.e., the $T_{set}$ region) may represent the edge of a region of uniformly high thermal conductivity to improve the uniformity of the temperature in the $T_{set}$ region. This may be achieved by depositing a high thermal conductivity material above the top cladding (e.g., replace $SiO_2$ with diamond), by thinning the cladding or BOX and placing a conductor in close proximity to the waveguide, or by removing the substrate and depositing a high thermal conductivity material below the bottom cladding. In either of these implementations the high thermal conductivity material may connect directly to the waveguide layer using thermal shunts.

Thus, in this embodiment, athermal operation of an FIR filter in a PIC is accomplished by heating a selected area of the filter to a fixed temperature. AMZI filter 100 (or a single stage thereof) contains a waveguide propagation section with more than one waveguide, and the waveguides are of different lengths. The waveguide propagation region is selectively heated, so that a given waveguide (i.e., waveguide 110) can be divided into a fraction that is at the ambient temperature ($T_{amb}$) and a fraction that is at the fixed temperature ($T_{set}$). The heated regions are chosen such that each waveguide has an equal length that is at temperature $T_{amb}$, and any remaining length is at $T_{set}$. The result is that in response to a fluctuation in $T_{amb}$, each waveguide has an identical change in the effective optical length, and the output frequency spectrum remains unchanged. The size of the heated region can be very small, making the technique power-efficient. Furthermore, as described in more detail below, varying $T_{set}$ may linearly shift the frequency spectrum of the filter. This property is useful both to intentionally modify the filter's frequency spectrum and to correct for deviations between the fabricated device and its pre-fabricated design.

The following description teaches operation of a single stage of an FIR device. It is to be understood that the same explanation also applies to a filter of multiple stages, such as an interleaver containing several cascaded AMZIs. For this description, waveguides in the waveguide propagation section are referred to numerically as 1, 2 . . . n, and the waveguide number is a variable 'w'. The waveguides' lengths are given by L(w). The effective index of the optical mode at position 'x' along a waveguide is $n_{eff}(w,x)$. The change in index with change in temperature ($dn_{eff}/dT$) at position 'x' along a waveguide is $$\frac{dn}{dT}(w, x).$$

An athermal FIR filter may comprise waveguides that are subdivided into a fixed temperature (i.e., heated) region and an ambient region, as shown in FIG. 1. The fixed temperature region may be hotter than the maximum ambient temperature to ensure device reliability over its operating temperature range. It is assumed for the following explanation that the waveguides all have the same cross section, both in dimensions and materials, such that:

$$n_{eff}(w, x) = \text{constant},$$

$$\frac{dn}{dT}(w, x) = \text{constant}$$

Under these conditions, the heated and ambient regions' lengths sum to equal the total length of the waveguide is:

$$L_H(w) + L_A(w) = L(w).$$

For an AMZI including two waveguides (such as AMZI 100) the heated region's length is chosen such that, $L(1) - L(2) = L_H(1) - L_H(2)$. If waveguide 1 is longer than waveguide 2, then the length of waveguide 1 that is heated may be equal to the difference in lengths, and waveguide 2 may be completely ambient (e.g., waveguide 112 shown in FIG. 1).

From the previous equation it follows that $L_A(1) = L_A(2)$. Since the lengths of each waveguide in the waveguide propagation region at the ambient temperature are the same, when the ambient temperature changes, the optical path length of each waveguide changes the same amount, and the differences in length between the waveguides do not change. Therefore, an ambient temperature change may cause a slight time or phase delay in the overall transfer function of the filter but there is no change in the frequency spectrum of the transfer function.

Figure 2:
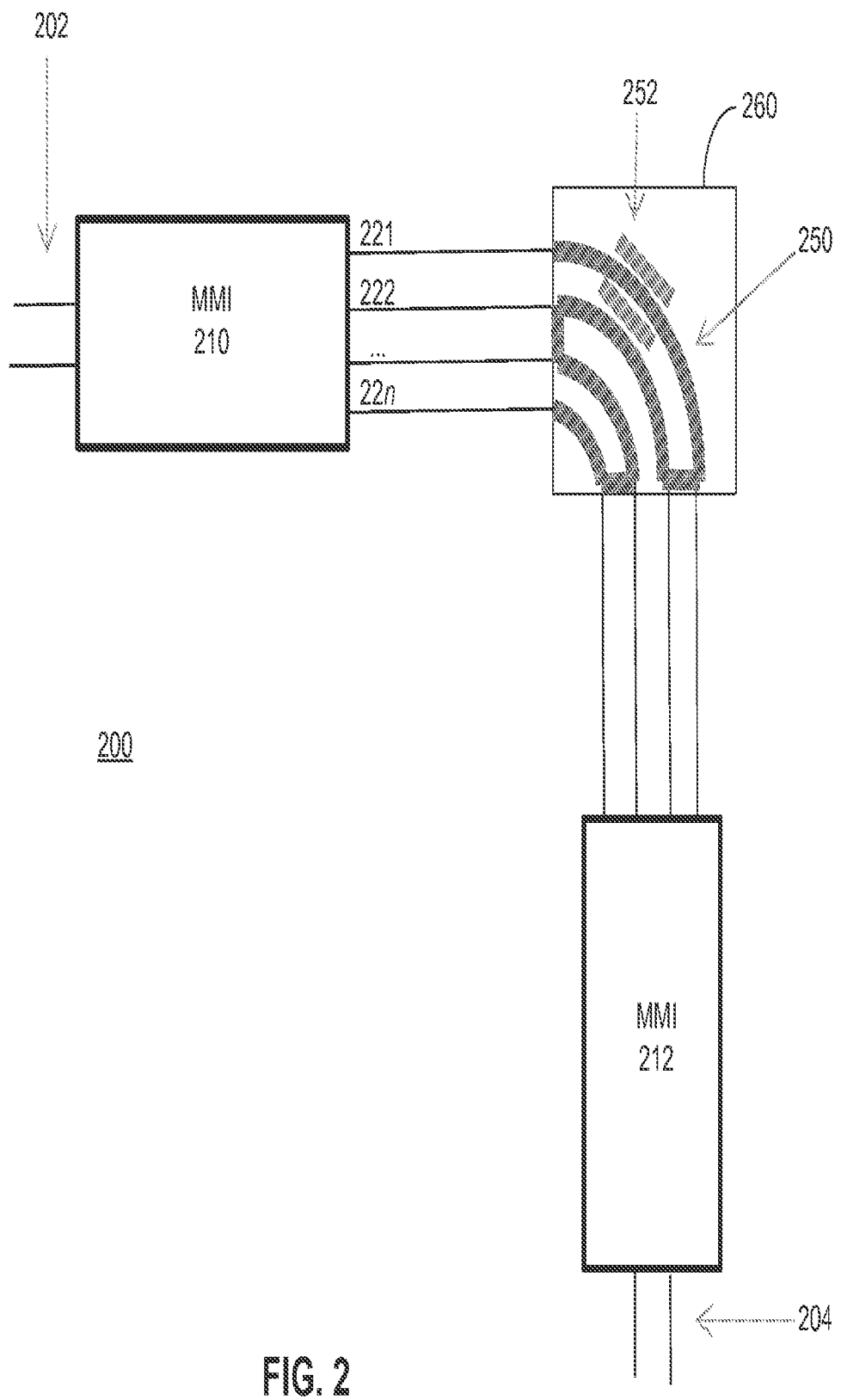
FIG. 2 is an illustration of an athermal optical device utilizing more than two waveguides according to an embodiment of the invention.

To extend this result to filters with more than two waveguides such as AWGs, fixed temperature lengths $L_H(w)$ are chosen such that $L_A(n) = L_A(1)$ for any n and 1. FIG. 2 is an illustration of an athermal optical device utilizing more than two waveguides according to an embodiment of the invention.

In this embodiment, FIR device 200 is illustrated as implementing an active technique to achieve athermicity in an FIR filter with more than two waveguides. Device 200 is shown to include two input ports 202 and two output ports 204. MMI 210 is coupled to said input ports to achieve mode transformation and interference. In other embodiments, MMI 210 may be replaced by other interferometric components, such as one or more Y-junctions, one or more directional couplers, or a star coupler.

A waveguide propagation section comprising waveguides 221-22n follows MMI 210, in which the different waveguides have different effective optical path lengths. MMI 212 follows said waveguide propagation section to achieve mode transformation and interference; output ports 204 follow MMI 212. In other embodiments, MMI 212 could also be replaced with another interferometric component.

In this embodiment, within said waveguide propagation section, one or more heaters 250 are used to heat part of the waveguide propagation region to a fixed temperature $T_{set}$, shown as region 260. The rest of said waveguide propagation section is subject to the surrounding ambient temperature. The cross section of the waveguide in the ambient region is constant, and as shown in this illustration, the length of the waveguide region at the ambient temperature is the same in each of the waveguides.

In this embodiment, heating element 250 comprises a single heating element used to heat each of waveguides 221-22n. This heating element may be, for example, a "snake-shaped" thin film resistor that runs along the length of several waveguides to be heated. Two potential locations of resistive thermal device (RTD) 252 for heat sensing are shown in this illustration. One location is between the traces of the thin film resistor (i.e., heating element 250). Another location is adjacent to the resistor but close enough that the temperature at the RTD is very close to the temperature of the resistor. Other configurations for both the heater and RTD can be used in other embodiments of the invention.

It is to be understood that the thermal gradient across device 200 at steady state is a function of $T_{set}$ and $T_{amb}$. At steady state, provided $T_{set} > T_{amb}$, the temperature at any location in the device may be described as a linear combination of $T_{amb}$ and $T_{set}$, satisfying the equation $T = a \cdot T_{amb} + b \cdot T_{set}$, where $a + b = 1$; there is not variation of the spatial distribution of thermal contours with changes in $T_{set}$ or $T_{amb}$.

Embodiments of the invention further enable a linear shift in the spectrum of the transfer function of the filter by changing temperature $T_{set}$. The teachings of this description are related to a single filter stage but could be applied to a filter with multiple stages. In addition, the mathematical analysis describes the response at a single output port to an input in a single input port, but can be extended to simultaneous inputs to different input ports.

An FIR filter implemented in a PIC may be understood to split and/or interfere input modes from one or more input ports, propagate several modes through different time-delay paths in the waveguide propagation section, and then combine these modes through interference at one or more output ports. The transfer function may be described with an impulse response function. This is the response of the system to an input which is a narrow pulse at time t=0, represented as a delta function, $\delta(t-0)$. The impulse response function of the filter for input port k and output port l is:

$$h_{k,l}(t) = \sum_{w=1}^{n} c_{k,l,w} \delta(t - d_w)$$

The input signal is split into waveguides numbered 1 through n, and the time delay to propagate through each waveguide is represented by $d_w$. When light in different waveguides are combined through interference at the output, the complex amplitude corresponding to each waveguide is represented by $c_{k,l,w}$. Representation of the filter's response as an impulse response function permits a description of the filter's transmission frequency spectrum. This is found by taking a Fourier transform of $h_{k,l}(t)$, which will be written as $H_{k,l}(\omega)$. Representation of the transmission frequency spectrum in this way permits a mathematical description of how changing the heating profile of the waveguides changes the spectrum.

The delay times $d_w$ are proportional to the effective path lengths of the waveguides. Since the effective ambient length of each waveguide is the same and the effective heated length of each waveguide is different, if the fixed temperature $T_{set}$ is changed, the new delay time ($g_w$) changes by an amount proportional to the total path delay minus a constant delay time, $d_0$, which is identical for each waveguide and corresponds to the unheated ambient length of each path. Mathematically this may be described by the following equation where the factor s equals 1 when there is no change in $T_{set}$, but has a different value when temperature is changed:

$$g_w = s \cdot (d_w - d_0) + d_0$$

The frequency spectrum after change in $T_{set}$ may be expressed in terms of $H_{k,l}(\omega)$ using the well-known Fourier transform properties, shown here for a function in time f(t) and its Fourier transform F(ω):

Time shift property: f(t−t$_0$) corresponds to F(ω)e$^{-j\omega t_0}$

Scaling property for real a: f(a*t) corresponds to $$\frac{1}{|a|}F\left(\frac{\omega}{a}\right)$$

Applying these properties, the frequency spectrum of the transfer function after change in T$_{set}$ is:

$$\frac{1}{|s|}H_{k,l}\left(\frac{\omega}{s}\right)e^{j\omega t_0(1-\frac{1}{s})}$$

The amplitude of this function is:

$$\left|\frac{H_{k,l}\left(\frac{\omega}{s}\right)}{s}\right|$$

This function represents a scaling in the width of the entire frequency spectrum. Because the shift in center frequency is small compared to the carrier frequency, this spectral shift may typically be indistinguishable from a linear shift of the entire frequency spectrum, in the wavelength range of interest.

Figure 3:
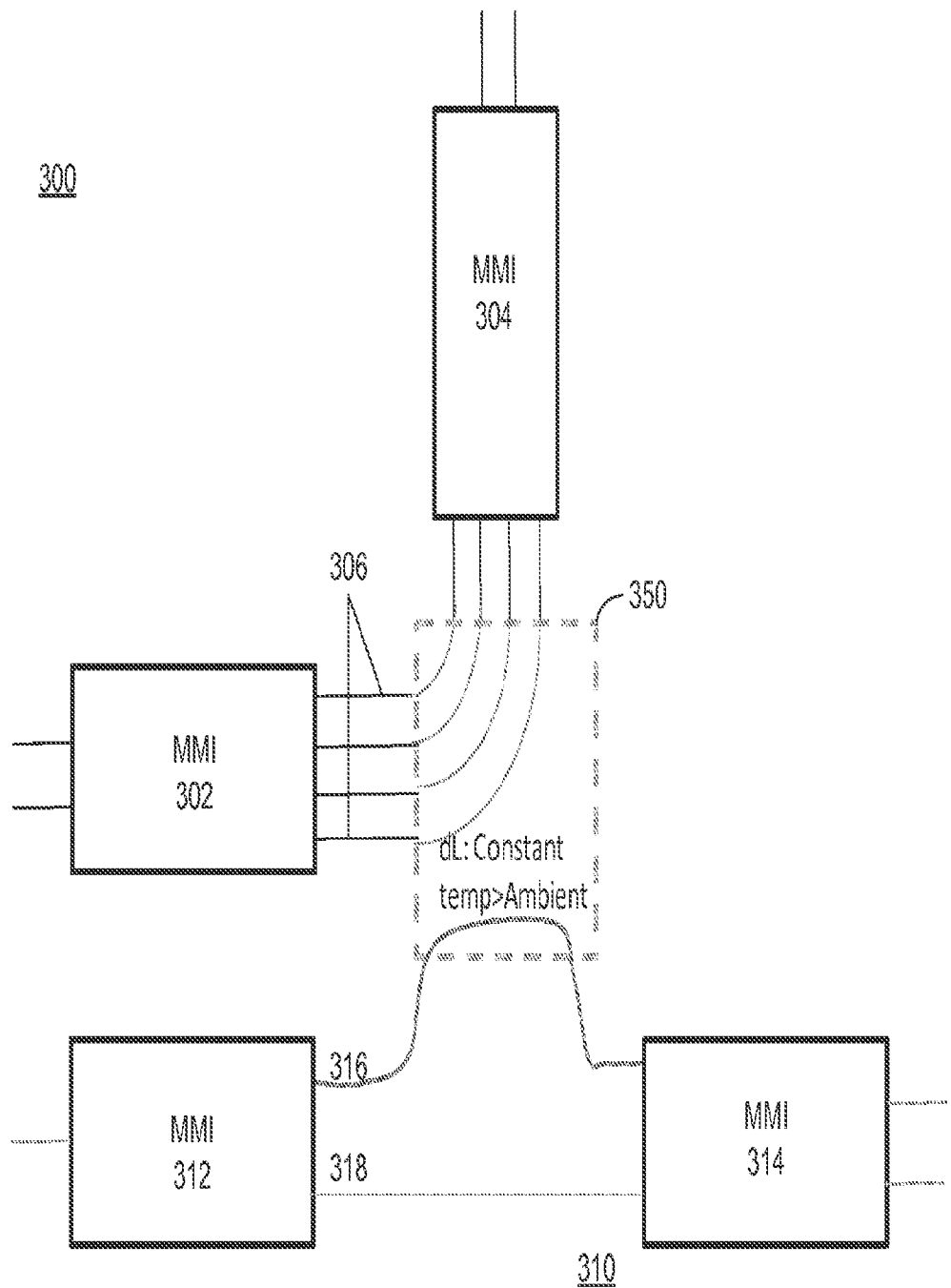
FIG. 3 illustrates two optical devices sharing a common heated region according to an embodiment of the invention.

FIG. 3 illustrates two optical devices sharing a common heated region according to an embodiment of the invention. In this embodiment, device 300 includes MMI 302 and 304, coupled via waveguide propagation section 306; device 310 includes MMI 312 and 314, coupled via waveguides 316 and 318.

In this embodiment, sections of waveguide propagation section 306 are heated in a manner similar to the example embodiment of FIG. 2 (i.e., wherein the waveguides of waveguide propagation section 306 have variable section lengths to be heated, and equal section lengths subject to the ambient temperature). Waveguide 316 includes a portion to be heated to a constant temperature, similar to the embodiment of FIG. 1. As shown in this illustration, devices 300 and 310 both utilize region 350, which is heated to a constant temperature (i.e., greater than the ambient temperature).

The heating of region 350 may be accomplished by using a single thin film electrode that covers the length of all of the waveguides within said region. In other embodiments, said constant temperature region may be implemented with the use of regions of high and/or low thermal conductivity to make the temperature in the T$_{set}$ region uniform, thereby avoiding heating the T$_{amb}$ region and improving power efficiency. This implementation allows the heater, RTD, heater driver circuit, and feedback control circuit to be shared between two or more FIR filter devices or stages in an FIR filter.

Figure 4:
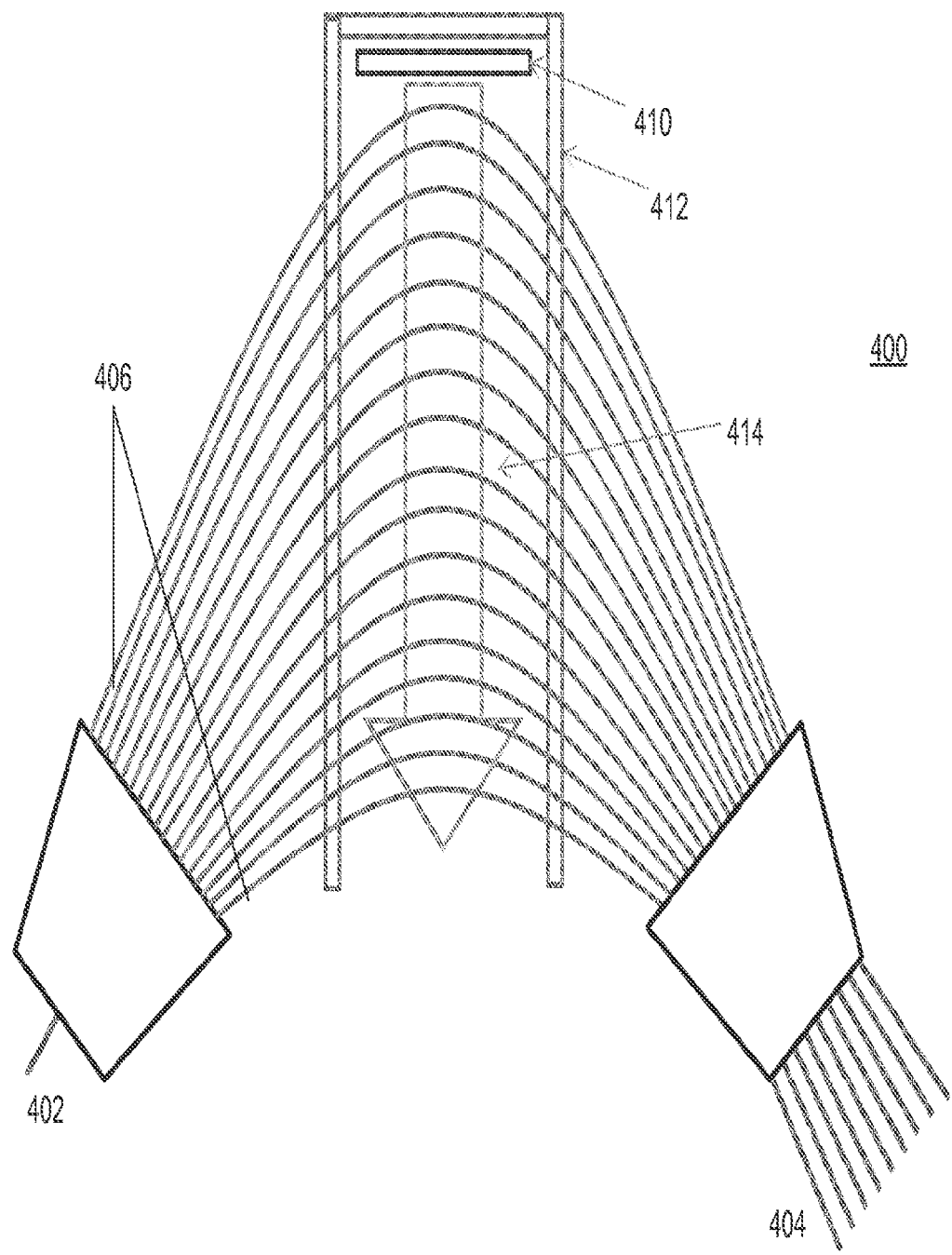
FIG. 4 is an illustration of an athermal device including a region of low thermal conductivity according to an embodiment of the invention.

FIG. 4 is an illustration of an athermal device including a region of low thermal conductivity according to an embodiment of the invention. In this embodiment, device 400 includes input port 402 and output port 404 coupled via waveguides 406. Device 400 utilizes heater 410 set at a fixed temperature to achieve athermal behavior. A region of low thermal conductivity, shown as region 412, is used to control the thermal gradient between heater 410 and the ambient region (i.e., the region outside of region 412).

The low thermal conductivity of region 412 may be achieved, for example, by etching away the waveguide slab region between waveguides. Additionally a thermally conductive substrate may be removed in this region. The direction of the generated thermal gradient (shown in this example by directional arrow 414) corresponds to a change in temperature with distance that is roughly linear.

The following description teaches the athermicity condition more generally where there is a thermal gradient in the vicinity of the heater, but the waveguides still have an invariant cross section. Assuming the thermal gradients are solely due to interaction of two thermal bodies—a heat sink held at the ambient temperature and the heater, and further assuming the temperature has reached steady state, the temperature at any location in the device may be described as a linear combination of the ambient and the fixed temperature. Temperature at a location along a waveguide may be expressed as:

T(w,x)=a(w,x)*T$_{amb}$+b(w,x)*T$_{set}$ a(w,x) is the fractional weight of the ambient temperature, and b(w,x) is the fractional weight of the set temperature. Both of these functions are temperature-invariant: They do not change as T$_{amb}$ or T$_{set}$ change. At all locations, a(w,x)+b(w,x)=1.

A waveguide may thus be described as being subdivided into effective lengths that are at the fixed and ambient temperatures, which may be different from the lengths which are and are not covered by a heating element:

$$L_A(w)=\int_0^{L(w)}a(w,x)dx$$

$$L_H(w)=\int_0^{L(w)}b(w,x)dx$$

Therefore the effective length of each waveguide that is heated to the heater temperature may change by a constant length between each adjacent waveguide, allowing the condition for athermicity to be satisfied. This embodiment demonstrates that not only can the shape of the heater or heated region be designed to heat different lengths of each waveguide in an FIR filter, but the thermal gradient can also be engineered so that the effective length of the heated region of each waveguide is correct to achieve athermal behavior.

The condition to be satisfied for athermicity in this case is also: L$_A$(k)=L$_A$(1) for any k and l. This method embodiment works in the presence of a thermal gradient since the waveguide can be subdivided into an effective length at the ambient temperature and an effective length at the heated temperature, and because these effective lengths do not change as a function of the ambient and fixed temperatures.

PICs according to embodiments of the invention, may also utilize passively athermal FIR filters using waveguide regions with different effective thermo-optic coefficients do/dT and heating a selected area of the PIC. By changing the power dissipated by the localized heater, the frequency spectrum of the FIR filter linearly shifts, despite its athermicity, in the presence of global ambient temperature changes. Shifting the frequency spectrum can accomplish both active tuning of the filter characteristic and correction of deviations of the fabricated device from design. Using this technique, neither monitoring of temperatures on the chip nor feedback during heater operation is necessary.

Figure 5:
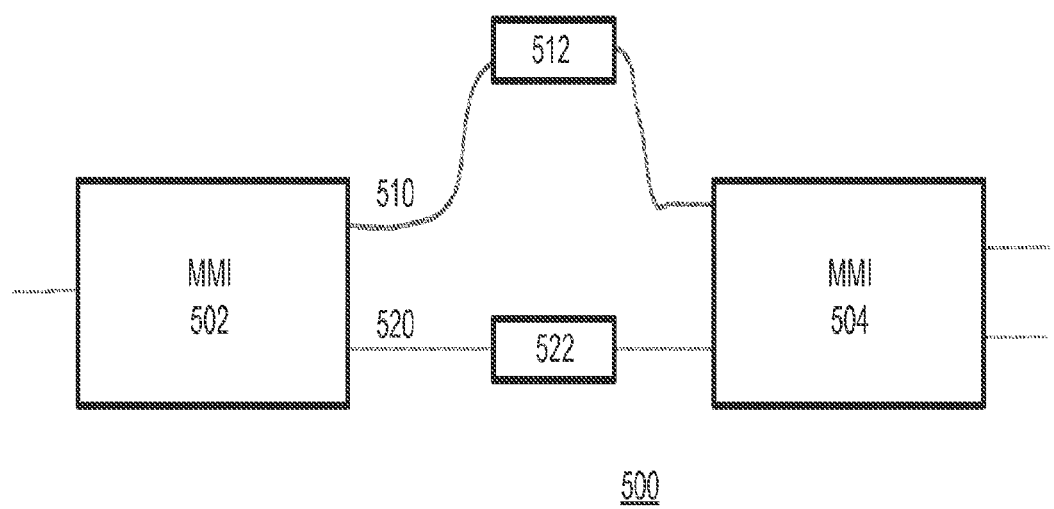
FIG. 5 is an illustration of an optical device for athermal operation and frequency spectrum tuning according to an embodiment of the invention.

FIG. 5 is an illustration of an optical device for athermal operation and frequency spectrum tuning according to an embodiment of the invention. In this embodiment, device 500 includes MMI 502 and MMI 504, coupled via waveguides 510 and 520; said waveguides comprise more than one value of dn/dT, either through differing materials or differing waveguide dimensions. If a heater is used for active tuning, constant power dissipation may be used such that the heated region is raised to $T_{amb}+T_{off}$, where $T_{off}$ is a function of heater power dissipation. Measurement of temperatures on the chip may not necessary for this embodiment; said active tuning can be used to compensate for fabrication variations or to intentionally shift the spectrum of device 500.

In this embodiment, one of either waveguide sections 512 or 522 comprises a region having a differing dn/dT value, either through differing materials or differing waveguide dimensions, compared to the rest of waveguides 510 or 520, respectively. One of either waveguide sections 512 or 522 may also function as an active tuning section through the use of a heater. For example, waveguide section 512 may comprise a region having a higher dn/dT value compared to the rest of waveguide 510 while waveguide section 522 comprises a heater, or vice-versa. In other embodiments, waveguide section 512 may comprise a both a region having a higher dn/dT value compared to the rest of waveguide 510 and a heater either overlapping or in sequence with said waveguide section (e.g., said high dn/dT region and said heater are placed in series), while waveguide section 522 comprises a normal waveguide (i.e., a passive waveguide comprising the same dn/dT value as the "low" dn/dT region of waveguide 510), or vice-versa.

Thus, embodiments of the invention may further utilize passively athermal FIR filters having waveguide regions with different values of $dn_{eff}/dT$ in combination with heating a selected area of the device. Changing the power dissipated by the localized heater linearly shifts the frequency spectrum of the FIR filter, despite its athermal design (i.e., athermicity in the presence of global ambient temperature changes due to the varying $dn_{eff}/dT$ materials used). Shifting the frequency spectrum can accomplish both active tuning of the filter characteristic and correction of deviations of the fabricated device from design. Using this technique, neither monitoring of temperatures on the chip nor feedback during heater operation is necessary: the heated region's temperature is a sum of the ambient temperature and an offset temperature that is a linear function of power dissipated by the heater: $T_{heated}=T_{amb}++T_{off}$.

The shift of the frequency spectrum is determined by the offset temperature, which may be set without the need for feedback, as it is proportional to the power dissipated in the heater. Since resistance of the heater does not vary strongly with temperature, the heater setpoint may be set with a constant current or constant voltage source. This technique may reduce power dissipation in comparison to the previously described embodiments, as heating is not required to achieve athermal operation but only to shift the frequency spectrum of the device. Some embodiments of the invention are further configured to heat a region within the high dn/dT waveguide cross section to maximize the energy efficiency of tuning.

For passive athermal operation, an FIR filter may use waveguide cross sections with differing effective thermo-optic coefficients (dn/dT). Each waveguide's length L(w) may be subdivided into lengths with the two different values of dn/dT:

$$L(w)=L_1(w)+L_2(w)$$

The net change in optical length with temperature is the same for all waveguides:

$$\frac{dn_1}{dT}*L_1(w)+\frac{dn_2}{dT}*L_2(w)=\text{constant}$$

The result is analogous to the effect of the previously described embodiments utilizing a heater to heat a portion of an optical device to a fixed temperature—when the ambient temperature is changed, the effective optical path length of each waveguide is changed by a fixed amount. The differences in effective optical path lengths between different waveguides are invariant with temperature. A change is ambient temperature may therefore result in a small time/phase delay, but no change in the transmission frequency spectrum.

This relation may also be stated in integral form, which is applicable for embodiments with free variation of do/dT along the waveguides' length instead of two discrete cross sections:

$$\int_0^{L(w)} \frac{dn}{dT}(w,x)*dx = \text{constant}$$

Using the above described passive athermal design, embodiments of the invention may further use a heater to heat a region of the waveguide propagation section for frequency spectrum tuning. The temperature of said heated region is $T_{amb}+T_{off}$. The thermal gradient in the vicinity of the heater may be described by b(w,x), where $0 \le b(w,x) \le 1$. The temperature at any point along a waveguide may be described by:

$$T(w,x)=T_{amb}+T_{off}*b(w,x)$$

The shape of the heated region may chosen such that:

$$\int_0^{L(w)} \frac{dn}{dT}(w,x)*b(w,x)*dx = u*\int_0^{L(w)} n_{eff}(w,x)*dx + v$$

Figure 6A:
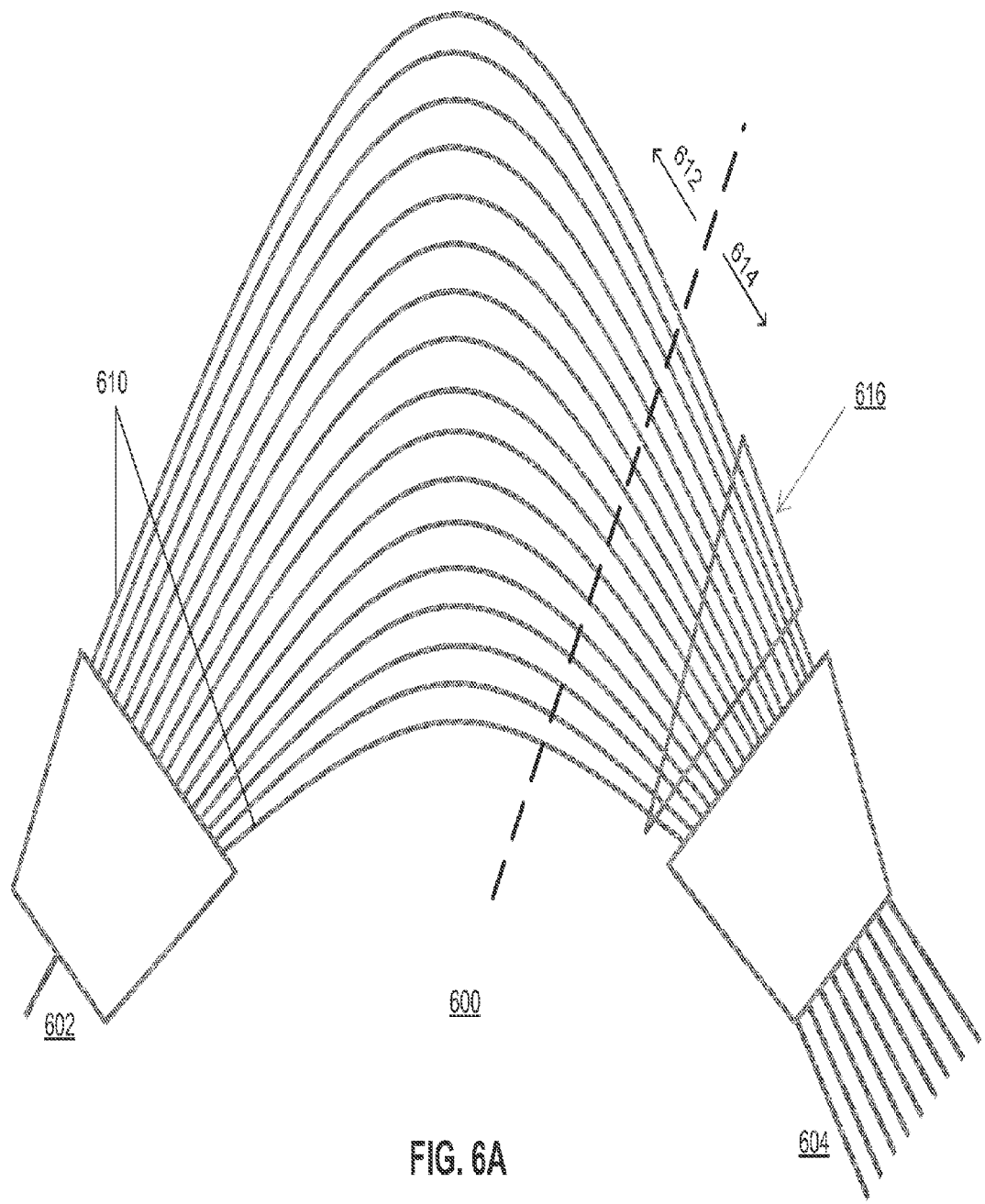
FIG. 6A-FIG. 6C are illustrations of athermal optical devices for frequency spectrum tuning according to embodiments of the invention.
Figure 6B:
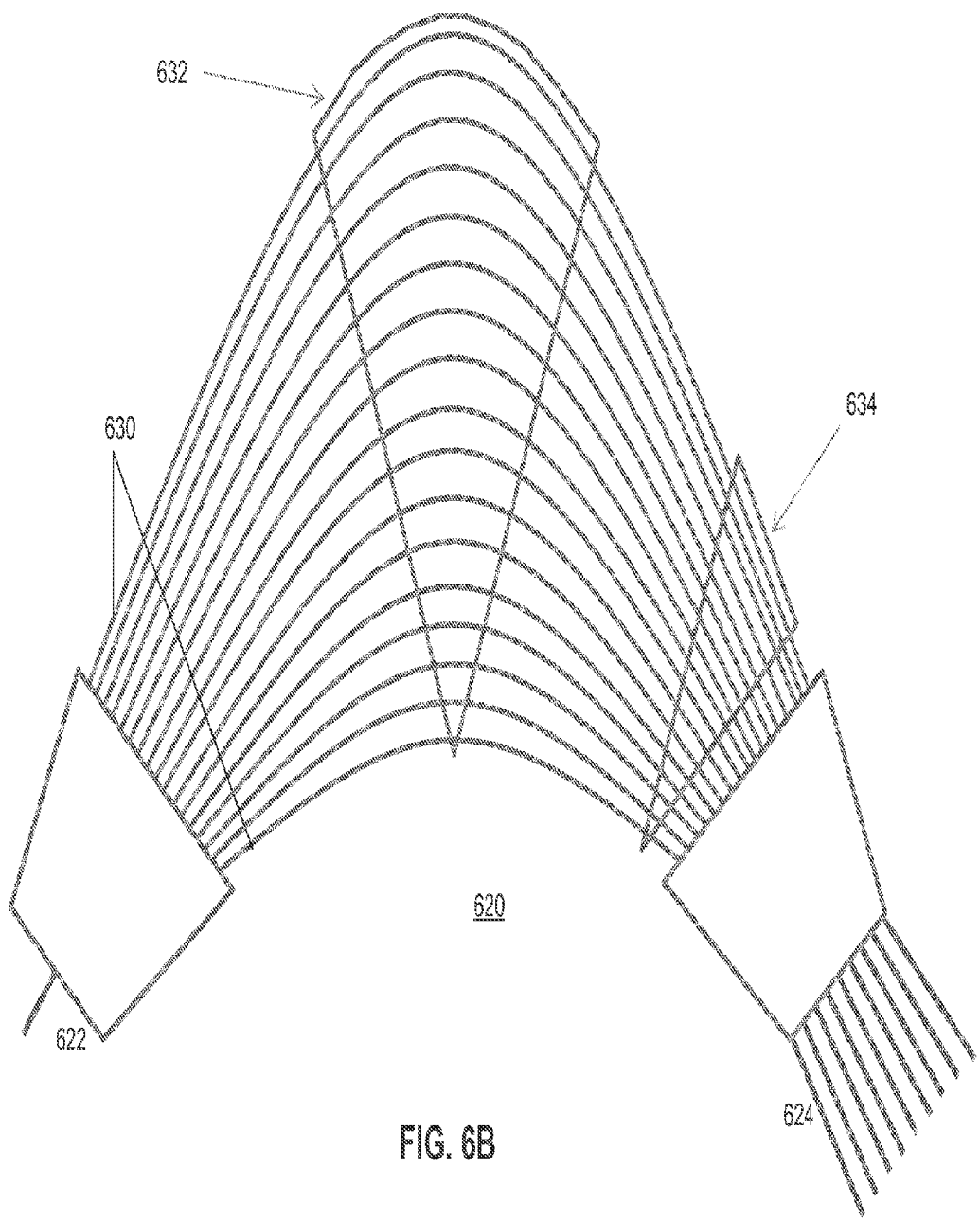
Figure 6C:
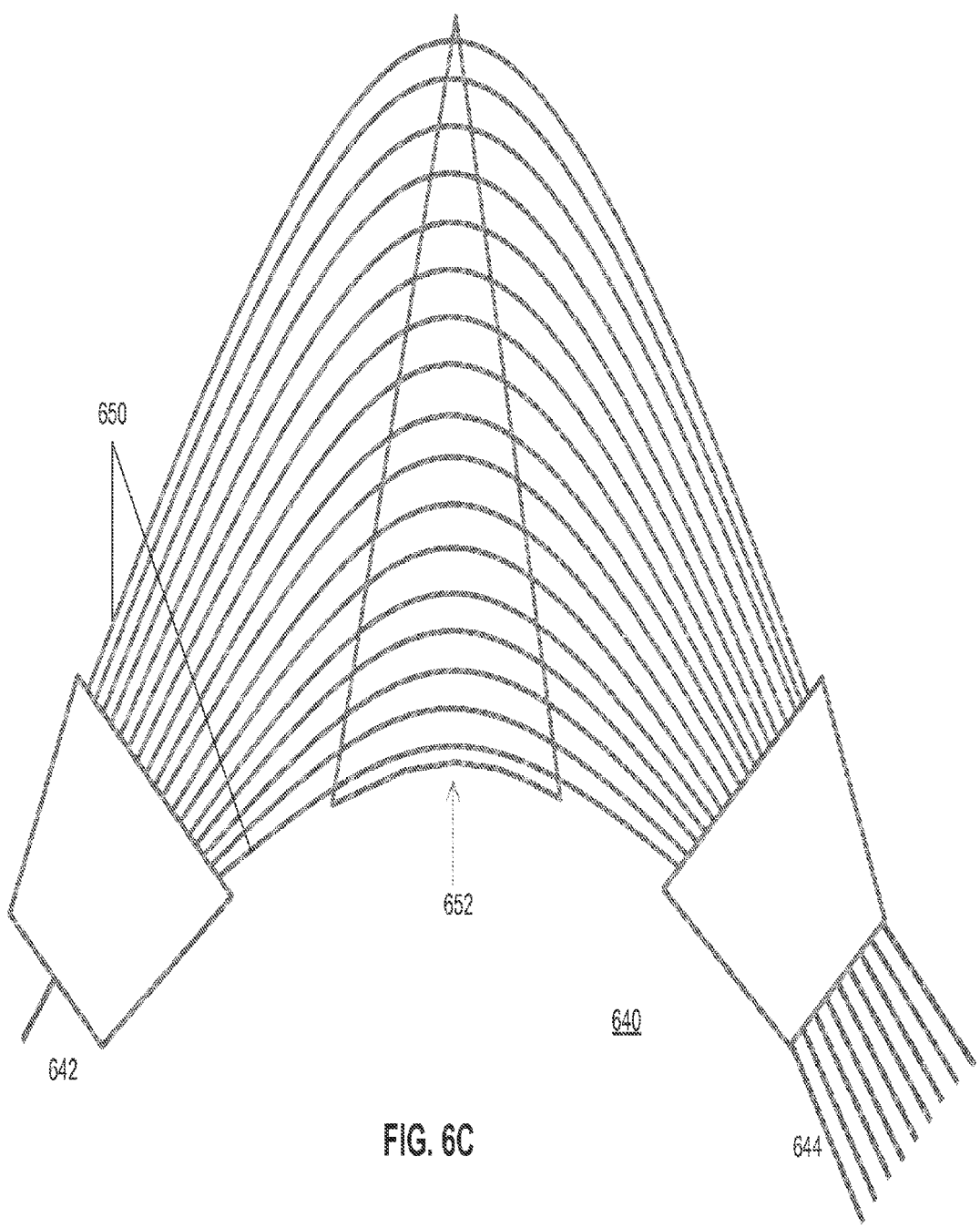

For an optical device with two waveguides in its waveguide propagation section, the equation may be satisfied by any combination of heaters—e.g., a single heater of any length on one of the two waveguides. For an optical device where the effective length difference in adjacent waveguides has a constant linear increment, the length of the heated region between adjacent waveguides may also have a constant linear increment. The heated region can therefore be wedge-shaped as shown in FIG. 6A-6C and described in further detail below.

When the offset temperature is changed, the relative changes in path lengths causes a linear shift in the transmission frequency spectrum of the FIR filter, as explained by the following equations.

The delay time of a waveguide when $T_{off}=0$ expressed in terms of the speed of light, c, is:

$$d(w,0) = \frac{1}{c}*\int_0^{L(w)} n_{eff}(w,x)*dx$$

When the heater is used the delay time changes to:

$$d(w,T_{off}) = \frac{1}{c}*\left((1+u*T_{off})*\int_0^{L(w)} n_{eff}(w,x)*dx + v*T_{off}\right)$$

$$d(w,T_{off}) = d(w,0)*(1+u*T_{off}) + v*T_{off}$$

The following variable substitutions may be made:

$$u = \frac{s-1}{T_{off}}$$

$$v = \frac{1-s}{T_{off}} * d_0$$

Now the equation for $d(w, T_{off})$ matches the form of the equation for waveguide delay with temperature shift from the previous section, $g_w = s*(d_w - d_0) + d_0$. Therefore, using the math in the previous section, if the unheated frequency spectrum of the transfer function is from input port k to output port l is:

$$H_{k,l}(\omega)$$

Once the heater temperature is heated to an offset from the ambient temperature of $T_{off}$, the magnitude of the frequency spectrum is:

$$\left| \frac{H_{k,l}\left(\frac{\omega}{1+u*T_{off}}\right)}{1+u*T_{off}} \right|$$

This function represents a scaling in the width of the entire frequency spectrum. As the shift in spectrum is entirely a function of the temperature offset from ambient and not a function of the ambient temperature, control of the transmission spectrum of the filter may be achieved without feedback.

FIG. 6A-FIG. 6C are illustrations of athermal optical devices for frequency spectrum tuning according to embodiments of the invention. These embodiments describe PICs utilizing heating elements in combination with athermal FIR filters using waveguide regions with different values of $dn_{eff}/dT$. FIG. 6A illustrates device 600 having input port 602 and output ports 604 coupled via plurality of waveguides 610. In this embodiment, waveguides 610 are comprised two waveguide segment regions—low dn/dT region 612 and high dn/dT region 614, which is shown to include heated region 616. The waveguide segments of region 614 are also shown to be shorter in length than the waveguide segments of region 612.

Said heated region's temperature is the sum of the ambient temperature and an offset temperature that is a linear function of power dissipated by the heater: $T_{heated} = T_{amb} + T_{off}$. The shift of the frequency spectrum is determined by the offset temperature, which may be set without the need for feedback, since it is proportional to the power dissipated in the heater. Since resistance of the heater does not vary strongly with temperature, the heater setpoint may be set with a constant current or constant voltage source. This technique may reduce power dissipation in comparison to the previously described embodiments as heating is not required to achieve athermal operation but only to shift the frequency spectrum of the device. Heating a region within high dn/dT region 614 may also maximize the energy efficiency of tuning.

For embodiments of the invention having thermo-optic coefficients (dn/dT) due to changes in the waveguide cross section, the athermicity condition may be stated as the equality between the change in optical path lengths per unit change in temperature for different waveguides. The change in optical path length of a waveguide per change in ambient temperature may be expressed as:

$$D(w) = \int_0^{L(w)} \frac{dn}{dT}(w, x) * a(w, x) \cdot dx$$

The condition to be satisfied is D(k)=D(l) for any k and l. The implication of the equation is that for a change in ambient temperature dT, the change in optical path length in each path in the waveguide propagation region is the same. This is analogous to the previous equation $L_A(1) = L_A(2)$, except that this more general description allows for variations in both $n_{eff}$ and dn/dT, and also allows for a design with arbitrary thermal gradients between the heated and ambient region expressed by a(w,x).

Thus embodiments of the invention include optical devices that utilize multiple dn/dT regions to decrease the power required to heat the above described $T_{set}$ region. FIG. 6A shows an AWG using regions with more than one waveguide cross section. The waveguide types may differ in refractive index n and in dn/dT. By using a region with a lower dn/dT for the majority of the waveguide propagation section (i.e., region 612), the total phase change along a waveguide with change in temperature is reduced. By using a region with higher dn/dT for the $T_{set}$ region (i.e., region 616), a smaller region needs to be heated to compensate for changes in $T_{amb}$. The length that is to be heated is reduced by a factor of $(dn/dT)_{high}/(dn/dT)_{low}$ compared to the length that would be heated if the entire device were made from the waveguide cross section with $(dn/dT)_{low}$.

FIG. 6B illustrates device 620 having input port 622 and output ports 624 coupled via plurality of waveguides 630. In this embodiment, waveguides 630 are materials having different thermo-optic coefficients (dn/dT); as shown in this illustration, a wedge-shaped region in the middle of device 620, shown as region 632, has a lower dn/dT value than the rest of the waveguide propagation region. The shape of region 632 is chosen to fulfill the condition for passive athermicity. Thus, the design of region 632 provides athermicity to device 620. In this embodiment, a heater (region 634) is disposed in or near the higher dn/dT region to improve the energy-efficiency of any desired spectral tuning.

FIG. 6C illustrates another variant of a passively athermal optical device with active tuning. Device 640 is shown as having input port 642 and output ports 644 coupled via plurality of waveguides 650. In this embodiment, wedge-shaped region 652 includes segments of waveguides 650 that have a higher dn/dT value than the rest of the waveguide segments of propagation region 650. In this embodiment, the heated region is coincident with high dn/dT wedge-shaped region 652 so the spectral tuning may be energy-efficient. The wedge shape is defined by the passive athermicity condition where the relative lengths of the waveguides with differing dn/dT are chosen to maintain a relative phase difference between adjacent waveguides with temperature fluctuation.

Reference throughout the foregoing specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout the specification are not necessarily all referring to the same embodiment. Furthermore, the particular features, structures or characteristics may be combined in any suitable manner in one or more embodiments. In addition, it is appreciated that the figures provided are for explanation purposes to persons ordinarily skilled in the art and that the drawings are not necessarily drawn to scale. It is to be understood that the various regions, layers and structures of figures may vary in size and dimensions.

The above described embodiments of the invention may comprise SOI or silicon based (e.g., silicon nitride (SiN)) devices, or may comprise devices formed from both silicon and a non-silicon material. Said non-silicon material (alternatively referred to as "heterogeneous material") may comprise one of III-V material, magneto-optic material, or crystal substrate material.

III-V semiconductors have elements that are found in group III and group V of the periodic table (e.g., Indium Gallium Arsenide Phosphide (InGaAsP), Gallium Indium Arsenide Nitride (GaInAsN)). The carrier dispersion effects of III-V based materials may be significantly higher than in silicon based materials, as electron speed in III-V semiconductors is much faster than that in silicon. In addition, III-V materials have a direct bandgap which enables efficient creation of light from electrical pumping. Thus, III-V semiconductor materials enable photonic operations with an increased efficiency over silicon for both generating light and modulating the refractive index of light.

Thus, III-V semiconductor materials enable photonic operation with an increased efficiency at generating light from electricity and converting light back into electricity. The low optical loss and high quality oxides of silicon are thus combined with the electro-optic efficiency of III-V semiconductors in the heterogeneous optical devices described below; in embodiments of the invention, said heterogeneous devices utilize low loss heterogeneous optical waveguide transitions between the devices' heterogeneous and silicon-only waveguides.

Magneto-optic materials allow heterogeneous PICs to operate based on the magneto-optic (MO) effect. Such devices may devices utilize the Faraday Effect, in which the magnetic field associated with an electrical signal modulates an optical beam, offering high bandwidth modulation, and rotates the electric field of the optical mode enabling optical isolators. Said magneto-optic materials may comprise, for example, materials such as such as iron, cobalt, or yttrium iron garnet (YIG).

Crystal substrate materials provide heterogeneous PICs with a high electro-mechanical coupling linear electro optic coefficient, low transmission loss, and stable physical and chemical properties. Said crystal substrate materials may comprise, for example, lithium niobate (LiNbO3) or lithium tantalate (LiTaO3).

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

The invention claimed is:

1. An optical device, comprising:
    an input port;
    an output port;
    a plurality of waveguides connecting the input port to the output port;
    a heater configured to heat only a portion of each waveguide to form a heated portion for each waveguide and a non-heated portion for each waveguide;
    a solid ambient material positioned around the plurality of waveguides and the heater, the solid ambient material having a first thermal conductivity; and
    at least one region of low thermal conductivity positioned between a heated portion and a non-heated portion, the at least one region of low thermal conductivity including a solid material having a second thermal conductivity less than the first thermal conductivity, the at least one region of low thermal conductivity at least partially thermally isolating the heated portion from the non-heated portion.

2. The optical device of claim 1, wherein the at least one region of low thermal conductivity extends across the plurality of waveguides and is positioned between the heated portions and the non-heated portions, for the plurality of waveguides.

3. The optical device of claim 2, wherein the at least one region of low thermal conductivity comprises first and second regions of low thermal conductivity positioned at respective first and second longitudinal ends of the heated portions.

4. The optical device of claim 3, wherein the heater is positioned between the first and second regions of low thermal conductivity.

5. The optical device of claim 4, wherein the heater is configured to form a thermal gradient along the heated portions of the waveguides, the thermal gradient including temperatures decreasing from the specified temperature to an ambient temperature.

6. The optical device of claim 1, wherein the at least one region of low thermal conductivity extends fully around the heater.

7. The optical device of claim 1, further comprising:
    a temperature sensor positioned proximate at least one of the heated portions and configured to sense a temperature; and
    a controller configured to receive the sensed temperature from the temperature sensor and control the heater to match the sensed temperature to a specified temperature.

8. The optical device of claim 7, wherein the controller is further configured to shift a frequency spectrum of the plurality of waveguides by adjusting the specified temperature.

9. The optical device of claim 8, wherein:
    the non-heated portions of the plurality of waveguides are exposed to an ambient temperature; and
    the specified temperature is independent of the ambient temperature.

10. The optical device of claim 7, wherein:
    the heater includes an electrically resistive element; and
    the controller is configured to control the heater by passing current through the electrically resistive element.

11. The optical device of claim 1, wherein the plurality of waveguides have the same cross sectional dimensions and are formed from the same materials.

12. The optical device of claim 1, wherein each non-heated portion is formed from a plurality of disconnected segments having a combined length, the combined lengths being equal for the non-heated portions of the plurality of waveguides.

13. The optical device of claim 1, wherein the plurality of waveguides are configured to spectrally filter an input light beam light with a spectral profile that is independent of an ambient temperature of the plurality of waveguides.

14. An optical device, comprising:
an input port;
an output port;
a plurality of waveguides connecting the input port to the output port;
a heater configured to heat only a portion of each waveguide to form a heated portion for each waveguide and a non-heated portion for each waveguide;
a solid ambient material positioned around the plurality of waveguides and the heater, the solid ambient material having a first thermal conductivity; and
a region of low thermal conductivity extending across the plurality of waveguides, the region of low thermal conductivity including a solid material having a second thermal conductivity less than the first thermal conductivity, the region of low thermal conductivity at least partially thermally isolating the heated portion for each waveguide from the non-heated portion for each waveguide.

15. The optical device of claim 14, further comprising:
a temperature sensor positioned proximate at least one of the heated portions and configured to sense a temperature; and
a controller configured to receive the sensed temperature from the temperature sensor and control the heater to match the sensed temperature to a specified temperature, the controller being further configured to shift a frequency spectrum of the plurality of waveguides by adjusting the specified temperature.

16. The optical device of claim 15, wherein:
the non-heated portions of the plurality of waveguides are exposed to an ambient temperature; and
the specified temperature is independent of the ambient temperature.

17. An optical device, comprising:
an input port;
an output port;
a plurality of waveguides connecting the input port to the output port;
a heater configured to heat only a portion of each waveguide to form a heated portion for each waveguide and a non-heated portion for each waveguide;
a solid ambient material positioned around the plurality of waveguides and the heater, the solid ambient material having a first thermal conductivity; and
a region of low thermal conductivity surrounding the heater and extending across the plurality of waveguides, the region of low thermal conductivity including a solid material having a second thermal conductivity less than the first thermal conductivity, the region of low thermal conductivity at least partially thermally isolating the heated portion for each waveguide from the non-heated portion for each waveguide.

18. The optical device of claim 17, further comprising:
a temperature sensor positioned proximate at least one of the heated portions and configured to sense a temperature; and
a controller configured to receive the sensed temperature from the temperature sensor and control the heater to match the sensed temperature to a specified temperature, the controller being further configured to shift a frequency spectrum of the plurality of waveguides by adjusting the specified temperature.

19. The optical device of claim 18, wherein:
the non-heated portions of the plurality of waveguides are exposed to an ambient temperature; and
the specified temperature is independent of the ambient temperature.

* * * * *